United States Patent
Yamamoto et al.

(10) Patent No.: US 7,577,009 B2
(45) Date of Patent: Aug. 18, 2009

(54) PWM CYCLOCONVERTER AND CONTROL METHOD FOR PWM CYCLOCONVERTER

(75) Inventors: Eiji Yamamoto, Fukuoka (JP); Hidenori Hara, Fukuoka (JP); Kouichi Eguchi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 313 days.

(21) Appl. No.: 11/628,480

(22) PCT Filed: May 31, 2005

(86) PCT No.: PCT/JP2005/009986

§ 371 (c)(1), (2), (4) Date: Dec. 1, 2006

(87) PCT Pub. No.: WO2005/119893

PCT Pub. Date: Dec. 15, 2005

(65) Prior Publication Data

US 2007/0217243 A1    Sep. 20, 2007

(30) Foreign Application Priority Data

Jun. 1, 2004 (JP) ............................. 2004-163375

(51) Int. Cl.
H02M 5/297 (2006.01)

(52) U.S. Cl. ........................ 363/163; 363/165

(58) Field of Classification Search ............ 363/159, 363/163–165, 157
See application file for complete search history.

(56) References Cited

FOREIGN PATENT DOCUMENTS

| JP | 5-316737 | A |   | 11/1993 |
|----|----------|---|---|---------|
| JP | 9-154280 | A |   | 6/1997 |
| JP | 10-225142 | A |   | 8/1998 |
| JP | 11-98840 | A |   | 4/1999 |
| JP | 11098840 | A | * | 4/1999 |
| JP | 2000-2724 | A |   | 1/2000 |
| JP | 2003-309975 | A |   | 10/2003 |
| JP | 2003-333851 | A |   | 11/2003 |

* cited by examiner

*Primary Examiner*—Jeffrey L Sterrett
*Assistant Examiner*—Fred E Finch, III
(74) *Attorney, Agent, or Firm*—Sughrue Mion, PLLC

(57) ABSTRACT

It is an object of the present invention to provide a PWM cycloconverter that can compensate an error between a voltage command and a real voltage generated by a commuting operation.

The PWM cycloconverter for solving the above-described problem includes: an input voltage phase detector (6) for detecting the phase of the voltage of a three-phase ac power source (1); a current direction detector (7) for detecting the direction of a current supplied to a two-way semiconductor switch (3); and a commutation compensator (11) for receiving the outputs of the input voltage phase detector and the current detector as inputs to compensate for a voltage command.

3 Claims, 6 Drawing Sheets

— AT THE TIME OF V1>V2
----- AT THE TIME OF V2>V1

— AT THE TIME OF V1<V2
----- AT THE TIME OF V2<V1

PWM CYCLOCONVERTER AND CONTROL METHOD FOR PWM CYCLOCONVERTER

TECHNICAL FIELD

The present invention relates to an electric power converter that can convert an output to an arbitrary frequency from an ac power source and more particularly to a control method for a PWM cycloconverter using a pulse width modulation (PWM) control system.

RELATED ART

The PWM cycloconverter is a kind of an electric power converter that performs a switching operation by a pulse width modulation system (refer it to as a PWM system, hereinafter) by the use of a semiconductor switch having a self arc suppressing ability like an inverter. Accordingly, in the inverter, the semiconductor switches arranged in series between the potentials of PN bus are turned on with time difference to avoid the semiconductor switches from being turned on at the same time to short-circuit the PN bus. This time difference is called a dead time.

In the PWM cycloconverter, a power source is connected to a load directly by nine semiconductor switches referred to as two-way switches. The two-way switch can supply a current to the load side from the power source, or to the power source from the load side. Under these circumstances, employed are a structure that reverse blocking type IGBTs shown in FIG. 2 are connected in anti-parallel forms or a structure that the IGBTs and diodes respectively connected in series and they are connected in anti-parallel forms.

Further, according to the PWM cycloconverter, in the ignition sequence of the two-way switches, the two-way switches are turned on and off in accordance with the ignition sequence called a commutation to prevent the short-circuit of the power source side and the load side from being opened.

As an example of such a cycloconverter, for instance, "PWM cycloconverter and method for driving it" is exemplified that is disclosed in Patent Document 1.
Patent Document 1: JP-A-11-98840 (FIG. 1, FIG. 5)
Patent Document 2: JP-A-2000-2724

FIG. 9 is a block diagram of a PWM cycloconverter and a method for driving it.

To a two-way switch part 3 shown in FIG. 9, a current direction detector 7 for discriminating the direction of a current supplied to the two-way switch 3 is connected. A commutation circuit 8 is provided for taking in other gate signals for driving forward direction semiconductor switches in the same output phases as those of the outputs of the current direction detector 7 and PWM commands and switching the ignition sequence of the two-way switches.

According to a commutation sequence by the commutation circuit 8 in this case, when the current is supplied from a three-phase ac power source 1 to a load motor 4, a sequence shown in FIG. 10(a) is selected. In this commutation sequence, when switches of Tr1 and Tr1' sides are turned off, the tr1' is firstly turned off. At this time, since the current supplied to the load motor 4 is supplied through the Tr1, the current is not shutoff. Then, Tr2 is turned on. At this time, a supply voltage V1 is larger than V2, that is, V1>V2, the current is supplied to a full line loop passing the Tr1. When V2 is larger than V1, that is, V2>V1, the current is supplied to a broken line loop through Tr2 to commute the current to the Tr2 from the Tr1. Then, the Tr1 is turned off. However, when V1 is larger than V2, that is, V1>V2, the commutation from the Tr1 to the Tr2 arises at this time. Finally, Tr2' is turned on to complete the commutation.

Further, on the contrary, when the current is supplied to the ac power source 1 from the load motor 4, a sequence shown in FIG. 10(b) is selected. The Tr1 is firstly turned off. Then, the tr2' is turned on. At this time, V1 is smaller than V2, that is, V1<V2, a loop current of a full line is supplied through the Tr1'. When V2 is smaller than V1, that is, V2<V1, a loop current of a broken line passing the Tr2' is supplied and commuted from the Tr1 to the Tr2. Then, the Tr1' is turned off. When V1 is smaller than V2, that is, V1<V2, the commutation from the Tr1 to the Tr2 arises. Finally, the TR2 is turned on to complete the commutation.

As the current direction detector 7, a circuit having a diode combined with a comparator such as a "voltage and current polarity detector" disclosed in, for instance Patent Document 2 can be used.

DISCLOSURE OF THE INVENTION

Problems to be Solved by the Invention

However, in the inverter, an error arises between an output voltage command and an actually outputted voltage (real voltage) due to the influence of the dead time. Also in the cycloconverter, an error arises between the output voltage command and the real voltage due to a commuting operation. When the error arises between the output voltage command and the real voltage, for instance, if a motor is connected to a load side, the voltage may not be applied to the motor as commanded to cause hunting.

Thus, the present invention is devised by considering the above-described problems and it is an object of the present invention to provide a PWM cycloconverter and a control method for a PWM cycloconveter in which an error between an output voltage command and a real voltage is eliminated and a stable operation can be carried out in driving a motor.

Means for Solving the Problems

In order to solve the above-described problems, according to claim 1, there is provided a PWM cycloconverter that is an electric power converter directly connected by a two-way semiconductor switch having two one-way semiconductor switches combined and respectively independently turned on and off, in which a current can be supplied only in one direction between each phase of a three-phase ac power source and each phase of the electric power converter with three-phase outputs, the on/off time of the two-way semiconductor switch being determined in accordance with a voltage command applied to a load connected to the output side of the two-way semiconductor switch, the PWM cycloconverter including:

an input voltage phase detector for detecting the phase of the voltage of the three-phase ac power source;

a current detector for detecting the direction of the current supplied to the two-way semiconductor switch; and a commutation compensator for receiving the outputs of the input voltage phase detector and the current detector as inputs to compensate for the voltage command.

Further, according to claim 2, there is provided a control method for the PWM cycloconverter according to claim 1, wherein output voltage commands are obtained by the commutation compensator from following formulas (1), (2) and (3):

$$Vu\_ref2 = Vu\_ref1 + \Delta V \quad (1)$$

$$Vv\_ref2 = Vv\_ref1 + \Delta V \quad (2)$$

$$Vw\_ref2 = Vw\_ref1 + \Delta V \quad (3)$$

under conditions that when the phases of the three-phase ac power source are respectively defined as $Vr = Vin*\sin\theta$ in, $Vs = Vin*\sin(\theta\ in-120)$ and $Vt = Vin*\sin(\theta\ in-240)$, if the output of the current detector is positive in sections of $0° \leq \theta\ in \leq 60°$, $120° \leq \theta\ in \leq 180°$ and $240° \leq \theta\ in \leq 300°$, and if the output of the current detector is negative in sections of $60°\leq \theta$ in$\leq 120°$, $180°\leq \theta$ in$\leq 240°$ and $300°\leq \theta$ in$\leq 360°$, $\Delta V$ represents a negative fixed value, and if the output of the current detector is negative in the sections of $0°\leq \theta$ in$\leq 60°$, $120°\leq \theta$ in$\leq 180°$ and $240°\leq \theta$ in$\leq 300°$, and if the output of the current detector is positive in the sections of $60°\leq \theta$ in$\leq 120°$, $180°\leq \theta$ in$\leq 240°$ and $300°\leq \theta$ in$\leq 360°$, $\Delta V$ represents a positive fixed value, and in this case, a calculation is carried out to obtain output voltages by defining Vu_ref2, Vv_ref2 and Vw_ref2 as output voltage command values of a U-phase, a V-phase and a W-phase respectively commuted by commutation compensator;

Vu_ref1, Vv_ref1 and Vw_ref1 Vout as output voltage command values of a U-phase, a V-phase and a W-phase;

Vr, Vs and Vt as input voltage values of an R-phase, an S-phase and a T-phase;

Vin as a peak value of an input voltage and θ in as a phase of the input voltage.

Further, according to claim 3, there is provided the control method for a PWM cycloconverter according to claim 2, wherein $\Delta V$ in the formulas (1), (2) and (3) of the output voltage commands is varied in accordance with a current value detected by the current detector.

Further, according to claim 4, there is provided the control method for a PWM cycloconverter according to claim 2 or 3, wherein when the two-way switch is not turned on or off even once during a carrier period, the output voltage commands are calculated from following formulas (4), (5) and (6):

$Vu\_ref2 = Vu\_ref1$ (4)

$Vv\_ref2 = Vv\_ref1$ (5)

$Vw\_ref2 = Vw\_ref1$ (6), and when the two-way switch is turned on and off at least once during the carrier period, the formulas (4) to (6) are changed to the formulas (1), (2) and (3) to calculate the output voltage commands and the output voltage commands are compensated for by the commutation compensator.

Advantage of the Invention

According to the present invention, since the commutation compensator is provided for receiving the outputs of the input voltage phase detector and the current direction detector as inputs to compensate for the voltage command by calculated results in accordance with the formulas (1) to (6), the error between the output voltage command and the real voltage can be eliminated. Further, when the motor is driven by the PWM cycloconverter, a stable operation can be carried out without causing a hunting state.

DESCRIPTION OF REFERENCE NUMERALS AND SIGNS

Figure 1:
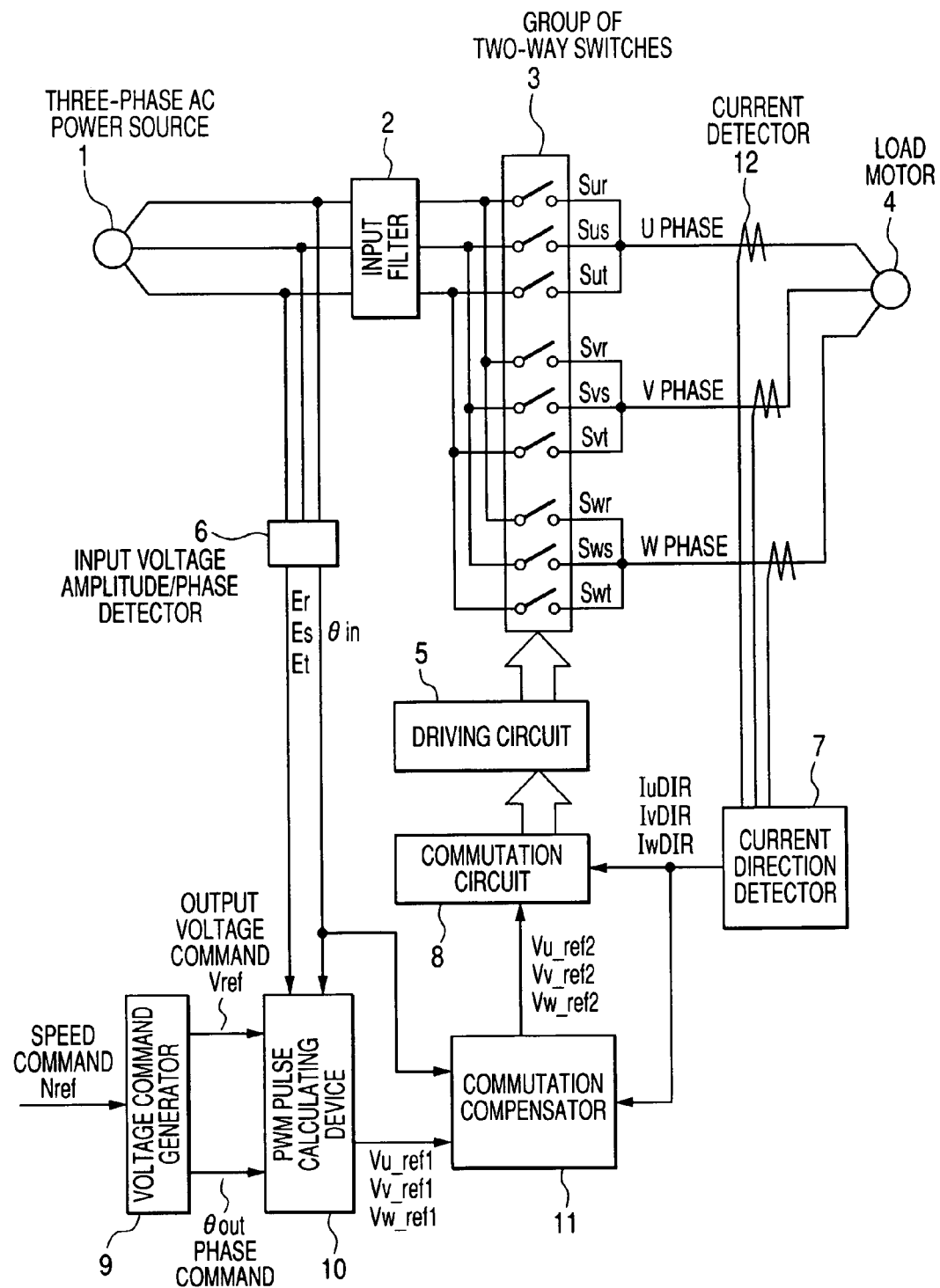
FIG. 1 is a block diagram of a PWM cycloconverter to which a method of the present invention is applied.

1 . . . three-phase ac power source
2 . . . input filter
3 . . . group of two-way switches
4 . . . load motor
5 . . . driving circuit
6 . . . input voltage amplitude/phase detector
7 . . . current direction detector
8 . . . commutation circuit
9 . . . voltage command generator
10 . . . PWM pulse calculating device
11 . . . commutation compensator
12 . . . current detector
21 . . . reverse-blocking GBT
22 . . . IGBT
23 . . . diode
Sur to Swt . . . two-way switch

BEST MODE FOR CARRYING OUT THE INVENTION

Now, an embodiment of the present invention will be described below by referring to the drawings.

First Embodiment

FIG. 1 is a block diagram showing an embodiment of a PWM cycloconverter of the present invention.

Figure 2:
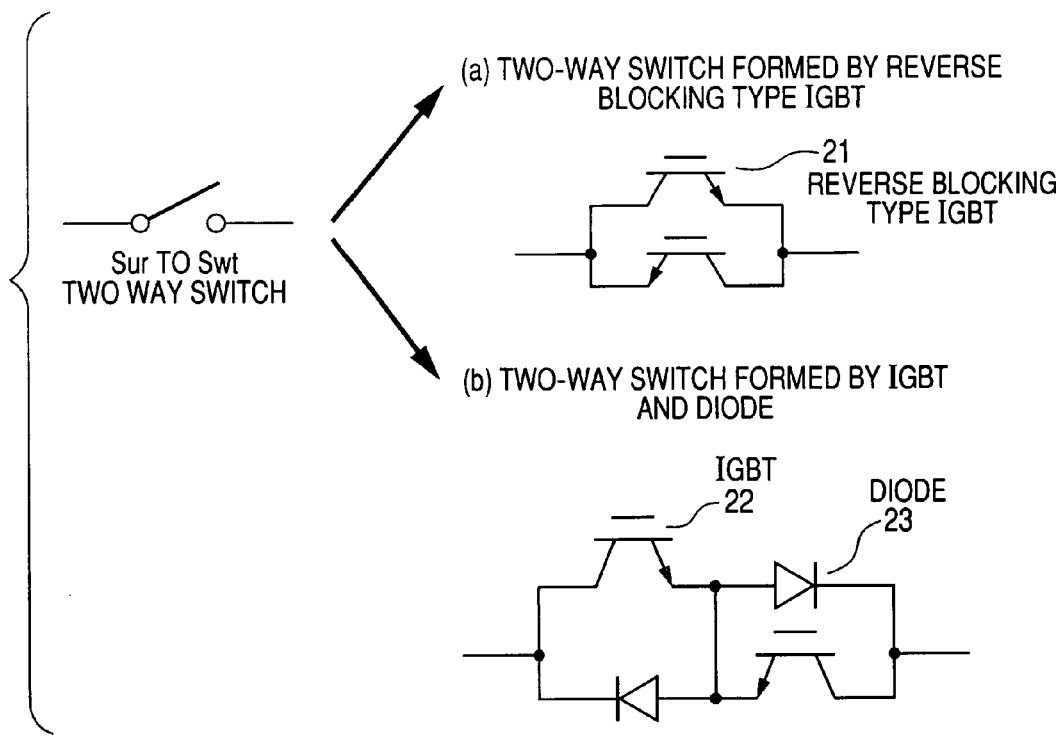
FIG. 2 is a diagram showing a connected example of a two-way switch illustrated in FIG. 1.

FIG. 2 is a diagram showing a connected example of a two-way switch illustrated in FIG. 1.

Figure 3:
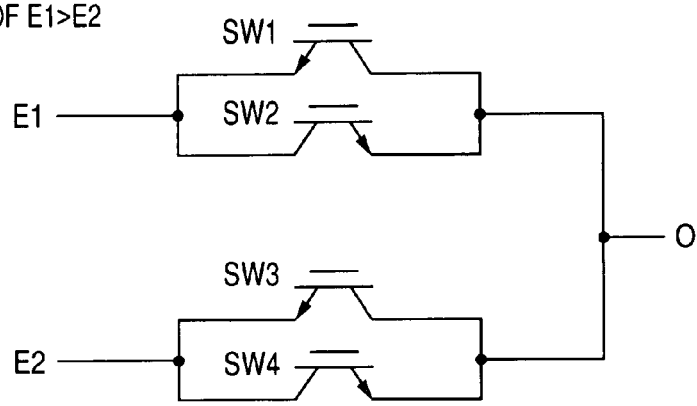
FIG. 3 is a circuit diagram in which an input having two phases and an output having one phase are merely taken out among a group of two-way switches shown in FIG. 1.

FIG. 3 is a circuit diagram in which an input having two phases and an output having one phase are merely taken out among a group of switches shown in FIG. 1.

Figure 4:
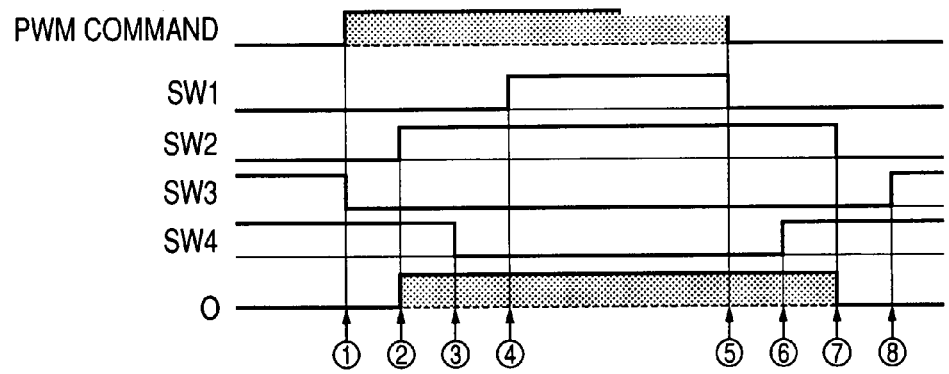
FIG. 4 is a diagram showing a commuting operation when the output current of the two-way switch shown in FIG. 1 is positive.

FIG. 4 is a diagram showing a commuting operation when the output current of the two-way switch shown in FIG. 3 is positive.

Figure 5:
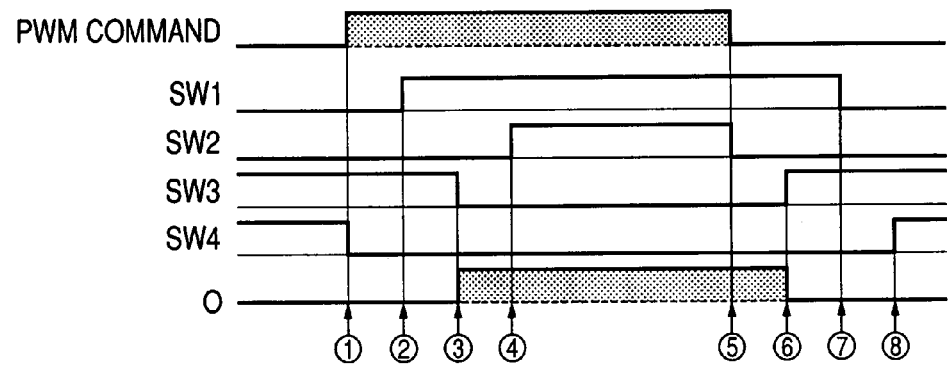
FIG. 5 is a diagram showing a commuting operation when the output current of the two-way switch shown in FIG. 4 is negative.

FIG. 5 is a diagram showing a commuting operation when the output current of the two-way switch shown in FIG. 4 is negative.

In FIG. 1, an input filter 2 is provided between a three-phase ac power source 1 and groups of two-way switches 3 composed of two-way switches Sur to Swt. The output of the group of the two-way switches 3 is connected to a load motor 4. The input filter 2 and the groups of the two-way switches 3 form a main circuit of the PWM cycloconverter.

Voltage is detected from an input side (a primary side) of the input filter 2 and input phase voltages Er, Es and Et and an input voltage phase θ in necessary for controlling the PWM cycloconverter are detected by an input power source amplitude/phase detector 6. On the other hand, in a speed command Nref, an output voltage command Vref and an output voltage phase command θ out are calculated by a voltage command generator 9.

The input phase voltages Er, Es and Et, the input voltage phase θ in, the output voltage command Vref and the output voltage phase command θ out calculate voltage commands of U, V and W phases (Vu_ref1, Vv_ref1, Vw_ref1) by a PWM pulse calculating device 10. The outputs of the groups of the two-way switches 3 are provided with current detectors 12 for detecting a current and the current directions of (IuDIR, IvDIR, IwDIR) of the phases are respectively detected by a current direction detecting circuit 7.

The voltage commands of U, V and W phases (Vu_ref1, Vv_ref1, Vw_ref1), the current directions of (IuDIR, IvDIR, IwDIR) of the phases and the input voltage phase θ in are inputted to a commutation compensator 11 to output voltage commands (Vu_ref2, Vv_ref2, Vw_ref2) of the U, V and W phases compensated by the commutation compensator 11. A commuting operation is determined in a commutation circuit 8 on the basis of the voltage commands (Vu_ref2, Vv_ref2, Vw_ref2) and the current directions (IuDIR, IvDIR, IwDIR) and the two-way switches Sur to Swt are driven by a driving circuit 5.

As shown in FIG. 2, the two-way switches Sur to Swt may be formed by combining reverse-blocking type IGBTs together in an anti-parallel form, or combining together diodes respectively connected in series to IGBTs in an anti-parallel form.

Now, the commutation of the PWM cycloconverter will be described below.

FIG. 3 is a circuit diagram in which an input having two phases and an output having one phase are merely taken out among groups of two-way switches 3.

In the switch shown in FIG. 3, a case will be described that a state in which SW3 and SW4 are turned on is commuted to a state in which SW1 and SW2 are turned on. Further, it is assumed that in an input voltage, the input voltage E1 of SW1 and SW2 is higher than the input voltage E2 of SW3 and SW4.

Further, FIG. 4 shows a PWM command and the on and off states of the switches SW1, SW2, SW3 and SW4 respectively when an output current Io_dir is positive, and FIG. 5 shows a PWM command and the on and off states of the switches SW1, SW2, SW3 and SW4, respectively when the output current Io_dir is negative. Circled figures in the lower stage of each drawing designate a switch sequence.

In accordance with the PWM command, the switch to which a current is not supplied (in FIG. 4, SW3, and in FIG. 5, SW4) in the two-way switch to which the current has been supplied is firstly turned off.

Then, the switch (in FIG. 4, SW2, and in FIG. 5, SW1) located in the direction required for the output current Io_dir to be continuously supplied in the two-way switch to which the current moves is turned on.

Subsequently, the switch (in FIG. 4, SW4, and in FIG. 5, SW3) to which the current has been hitherto supplied is turned off.

Finally, the switch (in FIG. 4, SW1, and in FIG. 5, SW2) opposite to the output current I0_dir in the two-way switch to which the current is newly supplied is turned on.

The above-described series of switching sequence is referred to as a commutation and specifically described in the Patent Document 1.

Further, in the commuting operation, in the case of FIG. 4 (E1>E2, Io_dir>0), a potential of an output side "o" changes within the operating range (2) to (7) shown in the lower stage.

In the case of FIG. 5 (E1>E2, Io_dir<0), the potential of the output side "o" changes within the operating range (3) to (6). Accordingly, to the PWM command, an actual output is large in FIG. 4 and the actual output is small in FIG. 5.

Figure 6:
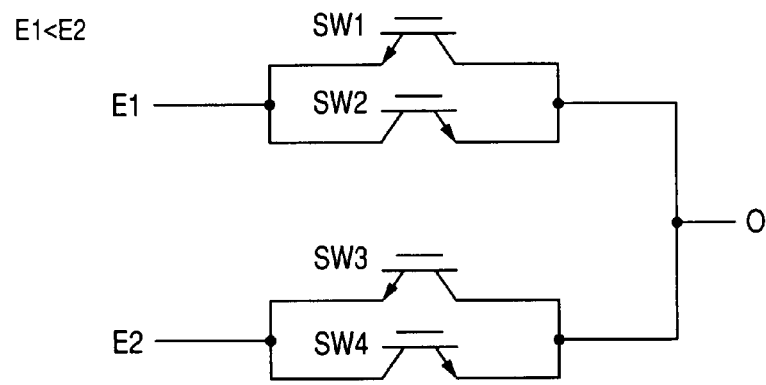
FIG. 6 is a circuit diagram when E1 is lower than E2, that is, E1<E2 in the two-way switch shown in FIG. 3.

FIG. 6 is a diagram showing that the input voltage is expressed: by E1<E2 in the two-way switch shown in FIG. 3.

Figure 7:
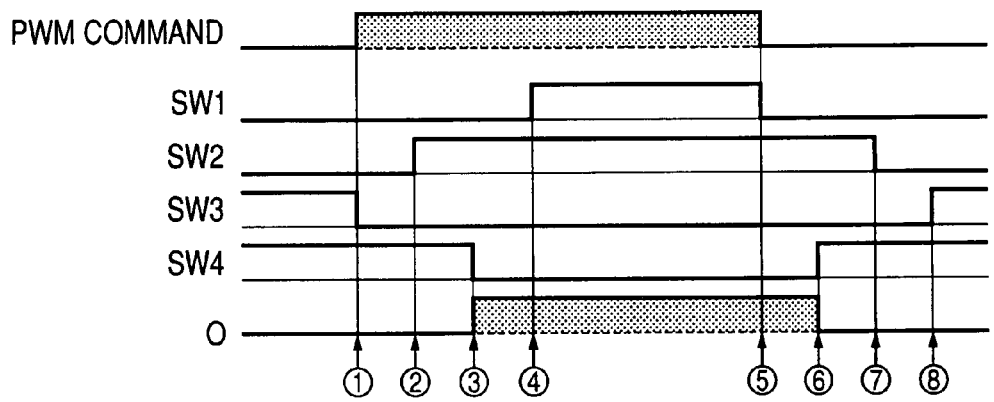
FIG. 7 is a diagram showing a commuting operation when the output current of the two-way switch shown in FIG. 6 is positive.
Figure 8:
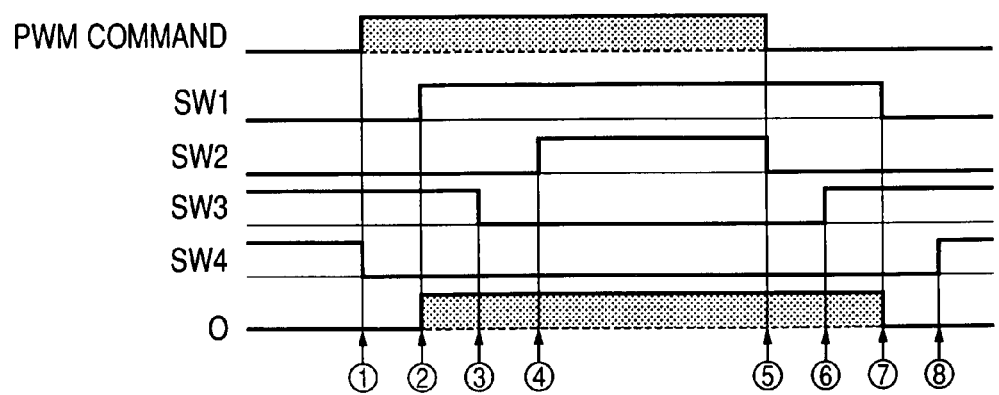
FIG. 8 is a diagram showing a commuting operation when the output current of the two-way switch shown in FIG. 6 is negative.

FIG. 7 is a diagram showing a case when the output current of the two-way switch shown in FIG. 6 is positive, and FIG. 8 is a diagram showing a case when the output current is negative.

FIGS. 6 to 8 show the case when the input voltage is expressed by E1<E2. An explanation of a commuting operation is the same as that described above with reference to FIGS. 3 to 5.

On the other hand, in the potential of an output side "o", an actual output is small in FIG. 7 and the actual output is large in FIG. 8.

The above description is summarized as shown in table 1.

TABLE 1

| Input voltage | Voltage Error | |
|---|---|---|
| | Direction of current | Difference of actually outputted voltage from voltage command |
| E1 > E2 | Io_dir > 0 | Large |
| | Io_dir < 0 | Small |
| E1 < E2 | Io_dir > 0 | Small |
| | Io_dir < 0 | Large |

Conditions that the input voltage is expressed by E1>E2 or E1<E2 are determined as described below.

When the phases of the three-phase ac power source are respectively defined as Vr=Vin*sin θ in, Vs=Vin*sin(θ in−120) and Vt=Vin*sin(θ in−240), the input voltage is expressed by E1>E2 in sections of 0°≦θ in≦60°, 120°≦θ in≦180° and 240°≦θ in≦300°, and the input voltage is expressed by E1<E2 in sections of 60°≦θ in≦120°, 180°≦θ in≦240° and 300°≦θ in≦360°.

In this case, symbols respectively designate following values.

Vr, Vs and Vt: input voltage values of an R-phase, an S-phase and a T-phase

Vin: a peak value of an input voltage

θ in: a phase of the input voltage

An operation of the commutation compensator 11 for correcting an error by the commuting operation will be described in detail.

The voltage commands of the U, V and W phases (Vu_ref1, Vv_ref1, Vw_ref1), the current directions of (IuDIR, IvDIR, IwDIR) of the phases and the input voltage phase θ in are inputted to the commutation compensator 11 to calculate the output voltage commands from formulas (1), (2) and (3) and take them as new output voltage commands.

$$Vu\_ref2 = Vu\_ref1 + \Delta V \quad (1)$$

$$Vv\_ref2 = Vv\_ref1 + \Delta V \quad (2)$$

$$Vw\_ref2 = Vw\_ref1 + \Delta V \quad (3)$$

As first conditions of the calculation, when the phases of the three-phase ac power source are respectively defined as Vr=Vin*sin θ in, Vs=Vin*sin(θ in−120) and Vt=Vin*sin(θ in−240), if the output of the current detector is positive in sections of 0°≦θ in≦60°, 120°≦θ in≦180° and 240°≦θ in≦300°, and if the output of the current detector is negative in sections of 60°≦θ in≦120°, 180°≦θ in≦240° and $300° \leq \theta$ in $\leq 360°$, $\Delta V$ represents a negative fixed value. Further, as second conditions, if the output of the current detector is negative in the sections of $0° \leq \theta$ in $\leq 60°$, $120° \leq \theta$ in $\leq 180°$ and $240° \leq \theta$ in $\leq 300°$, and if the output of the current detector is positive in the sections of $60° \leq \theta$ in $\leq 120°$, $180° \leq \theta$ in $\leq 240°$ and $300° \leq \theta$ in $\leq 360°$, $\Delta V$ represents a positive fixed value. In this case, symbols are respectively defined as follows.

Vu_ref2, Vv_ref2 and Vw_ref2: output voltage command values of a U-phase, a V-phase and a W-phase respectively commuted by commutation compensator Vu_ref1, Vv_ref1 and Vw_ref1 Vout: output voltage command values of a U-phase, a V-phase and a W-phase Vr, Vs and Vt: input voltage values of an R-phase, an S-phase and a T-phase Vin: a peak value of an input voltage θ in: a phase of the input voltage.

In a method according to claim 3, a voltage corrected value $\Delta V$ can be varied in accordance with a current value detected by the current detector. In the method according to claim 2, in a point where the current value changes to the negative value from the positive value, the voltage corrected value $\Delta V$ greatly changes. The point from the negative value to the positive value can be smoothly connected.

Further, in a method according to claim 4, when the two-way switch is not turned on or off even once during a carrier period, since the voltage error does not arise, the output voltage commands are calculated from following formulas (4), (5) and (6) and when the two-way switch is turned on and off at least once during the carrier period, the formulas (4) to (6) are changed to the above-described formulas (1), (2) and (3) to perform a calculation.

$$Vu\_ref2 = Vu\_ref1 \quad (4)$$

$$Vv\_ref2 = Vv\_ref1 \quad (5)$$

$$Vw\_ref2 = Vw\_ref1 \quad (6)$$

As described above, since an error between a command voltage and an actually outputted voltage in the commuting operation is compensated for, an output can be realized according to the output voltage command Vref that is desired to be originally outputted. Since the voltage error causes a hunting of a motor or a pulsation of torque, this method is applied so that the driving characteristics of the motor can be improved.

The present invention is explained in detail by referring to the specific embodiment, however, it is to be understood for a person with ordinary skill in the art that various changes or modifications may be made without departing the spirit and scope of the present invention.

This application is based on Japanese Patent Application No. 2004-163375 filed on Jun. 1, 2004 and the contents thereof are included herein as a reference.

[FIG. 1]
1: three-phase ac power source
2: input filter
3: group of two-way switches
4: load motor
5: driving circuit
6: input voltage amplitude/phase detector
7: current direction detector
8: commutation circuit
9: voltage command generator
10: PWM pulse calculating device
11: commutation compensator
12: current detector
Vref: output voltage command
Nref: speed command
θ out: phase command
A1: U phase
A2: V phase
A3: W phase

[FIG. 2]
(a) two-way switch formed by reverse blocking type IGBT
21: reverse blocking type IGBT
(b) two-way switch formed by IGBT and diode
23: diode
Sur to Swt: two way switch

[FIG. 3]
A1: in the case of E1>E2

[FIG. 4]
A1: in the case of Io_dir>0
A2: PWM command

[FIG. 5]
A1: in the case of Io_dir<0
A2: PWM command

[FIG. 7]
A1: in the case of Io_dir>0
A2: PWM command

[FIG. 8]
A1: in the case of Io_dir<0
A2: PWM command

Figure 9:
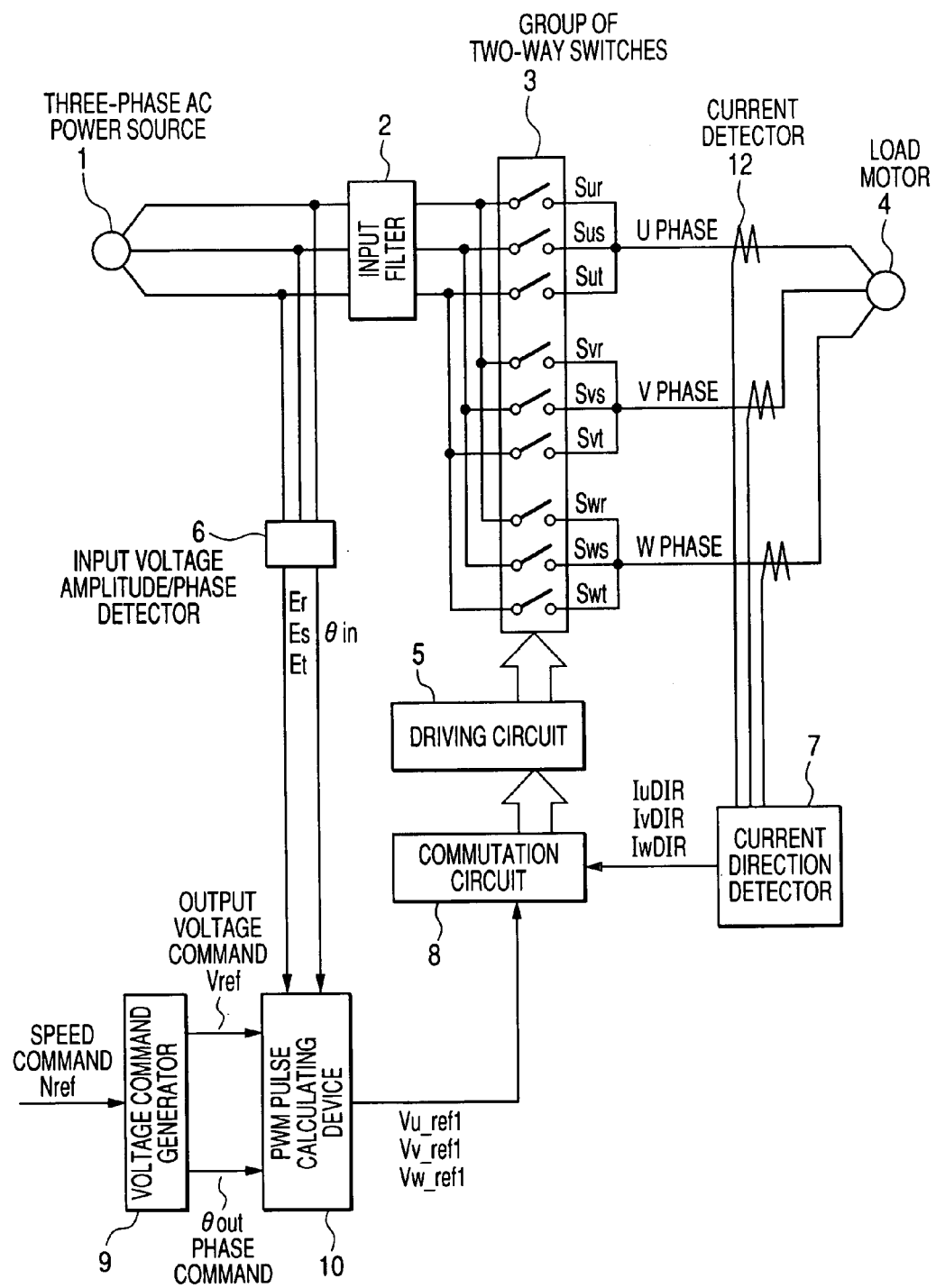
FIG. 9 is a block diagram of a usual PWM cycloconverter.

[FIG. 9]
1: three-phase ac power source
2: input filter
3: group of two-way switches
4: load motor
5: driving circuit
6: input voltage amplitude/phase detector
7: current direction detector
8: commutation circuit
9: voltage command generator
10: PWM pulse calculating device
12: current detector
Vref: output voltage command
Nref: speed command
θ out: phase command
A1: U phase
A2: V phase
A3: W phase

Figure 10A:
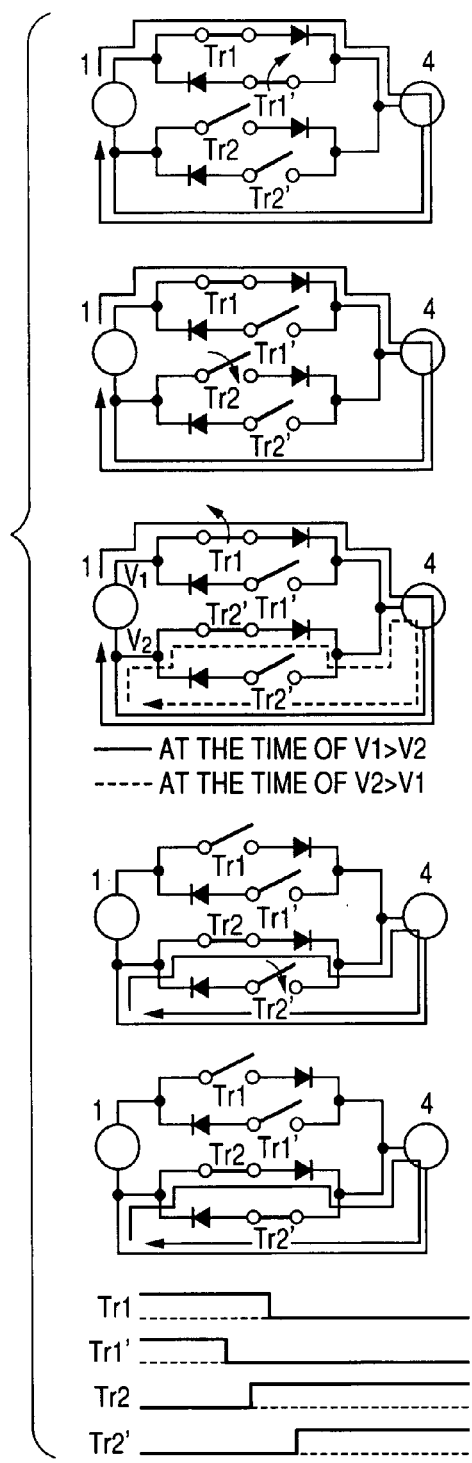
FIG. 10 is a diagram showing a commuting operation of the PWM cycloconverter shown in FIG. 9.
Figure 10B:
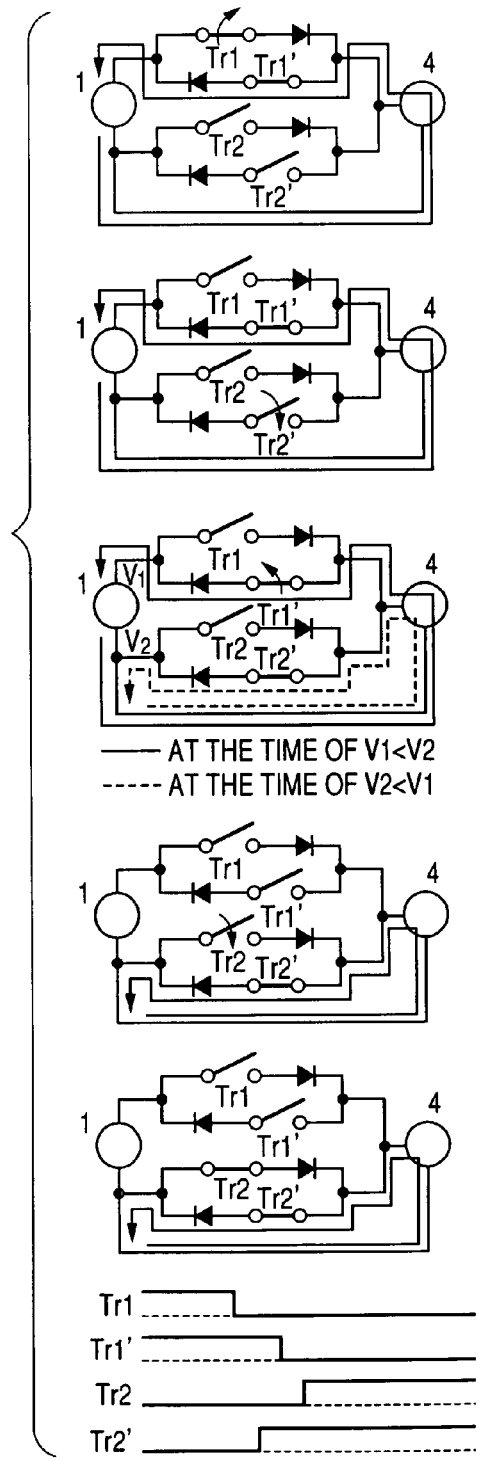

[FIG. 10]
(a)
A1: at the time of V1>V2
A2: at the time of V2>V1
(b)
A1: at the time of V1<V2
A2: at the time of V2<V1

The invention claimed is:

1. A PWM cycloconverter that is an electric power converter directly connected by a two-way semiconductor switch having two one-way semiconductor switches combined and respectively independently turned on and off, in which a current can be supplied only in one direction between each phase of a three-phase ac power source and each phase of the electric power converter with three-phase outputs, the on/off time of the two-way semiconductor switch being determined in accordance with a voltage command applied to a load connected to the output side of the two-way semiconductor switch, the PWM cycloconverter comprising:

an input voltage phase detector for detecting the phase of the voltage of the three-phase ac power source;

a current detector for detecting the direction of the current supplied to the two-way semiconductor switch; and a commutation compensator for receiving the outputs of the input voltage phase detector and the current detector as inputs to compensate for the voltage command;

wherein output voltage commands are obtained by the commutation compensator from following formulas (1), (2) and (3):

$$Vu\_ref2 = Vu\_ref1 \Delta V \quad (1)$$

$$Vv\_ref2 = Vv\_ref1 \Delta V \quad (2)$$

$$Vw\_ref2 = Vw\_ref1 \Delta V \quad (3)$$

under conditions that when the phases of the three-phase ac power source are respectively defined as $Vr = Vin*\sin\theta in$, $Vs = Vin*\sin(\theta in - 120)$ and $Vt = Vin*\sin(\theta in - 240)$, if the output of the current detector is positive in sections of $0° \leq \theta in \leq 60°$, $120° \leq \theta in \leq 180°$ and $240° \leq \theta in \leq 300°$, and if the output of the current detector is negative in sections of $60° \leq \theta in \leq 120°$, $180° \leq \theta in \leq 240°$ and $300° \leq \theta in \leq 360°$, $\Delta V$ represents a negative fixed value, and if the output of the current detector is negative in the sections of $0° \leq \theta in \leq 60°$, $120° \leq \theta in \leq 180°$ and $240° \leq \theta in \leq 300°$, and if the output of the current detector is positive in the sections of $60° \leq \theta in \leq 120°$, $180° \leq \theta in \leq 240°$ and $300° \leq \theta in \leq 360°$, $\Delta V$ represents a positive fixed value, and in this case, a calculation is carried out to obtain output voltages by defining Vu_ref2, Vv_ref2 and Vw_ref2 as output voltage command values of a U-phase, a V-phase and a W-phase respectively commuted by commutation compensator;

Vu_ref1, Vv_ref1 and Vw_ref1 as output voltage command values of a U-phase, a V-phase and a W-phase;

Vr, Vs and Vt as input voltage values of an R-phase, an S-phase and a T-phase;

Vin as a peak value of an input voltage and $\theta in$ as a phase of the input voltage.

2. The control method for a PWM cycloconverter according to claim 1, wherein when the two-way switch is not turned on or off even once during a carrier period, the output voltage commands are calculated from following formulas (4), (5) and (6):

$$Vu\_ref2 = Vu\_ref1 \quad (4)$$

$$Vv\_ref2 = Vv\_ref1 \quad (5)$$

$$Vw\_ref2 = Vw\_ref1 \quad (5), \text{and}$$

when the two-way switch is turned on and off at least once during the carrier period, the formulas (4) to (6) are changed to the formulas (1), (2) and (3) to calculate the output voltage commands and the output voltage commands are compensated for by the commutation compensator.

3. The control method for a PWM cycloconverter according to claim 1, wherein when the two-way switch is not turned on or off even once during a carrier period, the output voltage commands are calculated from following formulas (4), (5) and (6):

$$Vu\_ref2 = Vu\_ref1 \quad (4)$$

$$Vv\_ref2 = Vv\_ref1 \quad (5)$$

$$Vw\_ref2 = Vw\_ref1 \quad (6), \text{and}$$

when the two-way switch is turned on and off at least once during the carrier period, the formulas (4) to (6) are changed to the formulas (1), (2) and (3) to calculate the output voltage commands and the output voltage commands are compensated for by the commutation compensator.

* * * * *